Oct. 24, 1933. O. WIDMAIER 1,931,784
SMALL ELECTRIC MOTOR
Filed May 28, 1931
Fig. 1
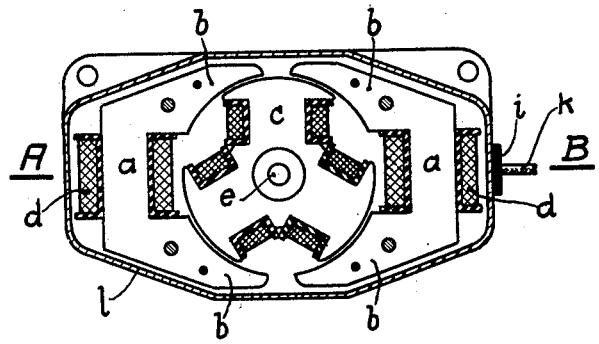
Fig. 2
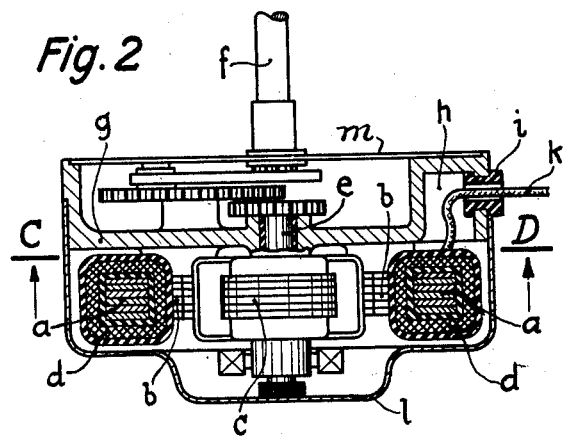
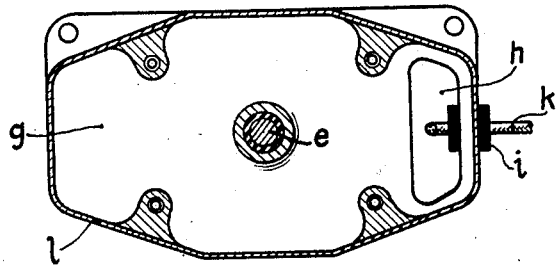
Fig. 3
Inventor
Otto Widmaier
by Steward & McKay
his attorneys Patented Oct. 24, 1933

1,931,784

UNITED STATES PATENT OFFICE 1,931,784

SMALL ELECTRIC MOTOR

Otto Widmaier, Stuttgart, Germany, assignor to Robert Bosch Aktiengesellschaft, Stuttgart, Germany Application May 28, 1931, Serial No. 540,710, and in Germany June 10, 1930

3 Claims. (Cl. 172—36)

The present invention relates to small electric motors having narrow elongated bases, which for example are suitable for operating wind-screen-wipers of vehicles. In known forms of construction the magnet system consists of two horse-shoe shaped halves, the arms of which, which are constructed as pole shoes, surround the armature.

According to the invention the exciting windings are wound round the yokes of the two horse-shoe shaped halves. The motor has a narrow base in the plane, vertical to the axis of the armature, as the unwound arms lie flat against the armature and can be tapered towards their ends.

An electric wind-screen-wiper motor for motor vehicles is illustrated by way of example in the drawing as one form of construction of the present invention. In the drawing, Figure 1 is a section through the motor.

Figure 2 is a section on the line AB of Figure 1 and

Figure 3 is a section on the line CD of Figure 2.

Two similar horse-shoe shaped members $a$ which are composed of stamped sheet iron, form the magnet frame of the motor. Their two arms $b$ are constructed as pole shoes and surround a triple-armed-armature $c$. An excitation winding $d$ is wound round each yoke of the magnet arms $a$. The ends of the arms $b$ of one member face those of the other member and are separated therefrom by an air gap and have the same polarity as such opposed arms. The motor therefore has a two-pole magnet system.

A suitable drive consisting of a gear wheel and crank, is interposed between a shaft $e$ of the armature $c$ and a shaft $f$ to which the windscreen wiper (not shown) is secured the drive converting the rotary motion of the armature shaft $e$ into a rocking motion of the wiper shaft $f$. This gear drive is mounted in a chamber which is separated from the motor by a wall $g$ and which extends over a portion only of the base of the motor to provide for chamber $h$ extending laterally of the base and which is to be open to the motor.

A bore, having an insulating bush $i$ through which is introduced a cable $k$ leading to the motor, is made in the outer wall of this chamber $h$. The motor is protected on the outside by a cap $l$ which can be removed independently of the cable $k$.

The casing of the device is thus made up of the wall or plate $g$, the cap $l$, and the cover $m$. The plate $g$ is so shaped as to provide two chambers on opposite sides thereof, one shown at $h$ communicating with the compartment between this plate and the cap $l$ for the motor, and the other on the opposite side of the plate between same and the cover $m$ for the gearing.

As can be seen from Figure 1, the two horse-shoe shaped magnet halves $a$ taper inwardly towards their yoke, the outline of the casing being thus formed in the shape of a flattened octagon the major axis of which is located horizontally when the wiper is being assembled. Little interference occurs in the driver's field of vision on account of the relatively small dimensions of the casing both laterally and vertically. The known multiple arm armature $c$ enables the constructional height of the motor in the direction of the armature axis to be relatively small so that the motor projects slightly and the pane of glass or the frame to which it is secured is only slightly loaded by overhanging. Further the exciting windings $d$ can be wound round the two yokes of the magnet sleeves $a$, making use of the usual winding device.

Various modifications will occur to those skilled in the art and it is to be understood that the invention is not limited to the details just described.

On account of its narrow construction the new motor is particularly advantageous for wind-screen-wiper motors but it can be used for any other purpose for which it is required.

I claim:

1. In a windshield wiper, a casing comprising an inside plate formed to provide two chambers, gearing disposed in one of said chambers, the casing also containing a compartment and a motor therein connected to drive said gearing, the other chamber opening into said compartment and giving passage to an electric conductor for said motor.

2. In a windshield wiper, a casing comprising a plate formed to provide a chamber on one face, gearing in said chamber, the plate having a second chamber opening through the opposite face, a cap fitting over the opposite face of said plate and forming therewith a compartment with which said second chamber communicates, a motor in said compartment, and a lead passing through said second chamber to said motor.

3. In a windshield wiper, a casing comprising a plate formed to provide a chamber on one face and a second chamber opening through the opposite face, gearing in the first chamber, a cover for said first chamber, a cap fitting over the opposite face of said plate and forming a compartment with which the second chamber communicates, a motor in said compartment connected to the gearing, and a lead passing through the second chamber into said compartment to said motor.

OTTO WIDMAIER.